United States Patent [19]

Katz et al.

[11] Patent Number: 4,681,985
[45] Date of Patent: Jul. 21, 1987

[54] PREMOLDED MECHANICALLY PRESTRESSED VOLTAGE STRESS CONTROL CONES FOR HIGH VOLTAGE CABLES AND METHOD OF FABRICATING SAME

[75] Inventors: Carlos Katz, Edison; Attila F. Dima, Piscataway; George S. Eager, Jr., Upper Montclair, all of N.J.

[73] Assignee: Cable Technology Laboratories, Inc., New Brunswick, N.J.

[21] Appl. No.: 726,781

[22] Filed: Apr. 24, 1985

[51] Int. Cl.$^4$ ........................................... H02G 15/068
[52] U.S. Cl. .......................... 174/73 R; 174/DIG. 8; 264/230
[58] Field of Search .......... 174/73 R, 73 SC, DIG. 8; 264/230

[56] References Cited

U.S. PATENT DOCUMENTS 3,317,655 5/1967 Oatess et al. ................. 174/73 R
4,035,534 7/1977 Nyberg ..................... 174/73 R X
4,365,947 12/1982 Bahder et al. .................. 425/384

FOREIGN PATENT DOCUMENTS

1640699 8/1970 Fed. Rep. of Germany .... 174/73 R
90751 1/1968 France ............................. 174/73 R
1434719 5/1976 United Kingdom ......... 174/DIG. 8

Primary Examiner—Laramie E. Askin
Attorney, Agent, or Firm—Hopgood, Calimafde, Kalil, Blaustein & Judlowe

[57] ABSTRACT

Voltage stress control cones for high voltage cable terminations are produced by premolding and radially expanding to mechanically prestress. The mechanically prestressed premolded cone is slipped over the insulation of a cable end and heat relaxed to shrink tightly over the cable. The cone is fabricated from cross-linkable polyethylene or other cross-linkable polymeric material having substantially the same electrical and thermal characteristics as the cross-linked polymeric insulation of the cable. A semiconductive layer of cross-linked polymeric material provides the transition between the insulation of the cone and the semiconductive insulation shield of the cable.

14 Claims, 12 Drawing Figures

PREMOLDED MECHANICALLY PRESTRESSED VOLTAGE STRESS CONTROL CONES FOR HIGH VOLTAGE CABLES AND METHOD OF FABRICATING SAME

BACKGROUND OF THE INVENTION

The present invention relates to terminations of high voltage cables and, particularly, to the voltage stress control cones used for modifying the voltage gradients at the terminations.

The voltage stress control cone modifies the voltage stress distribution at the end of a cable to protect the dielectric insulation from degradation and eventual failure due to the high voltage stress between the electrically conducting core of the cable and the adjacent elements at ground potential forming a part of the end termination. The cone is normally located a given distance from the end of the cable. The distance is determined as a function of the flashover characteristics of the environment in which the cone is placed.

For cables currently available for use below 35 kv, stress control cones can usually be premolded in a factory and slipped over the cable in the field. Such premolded voltage stress control cones are acceptable also for cables rated as high as 35 kV when such cables have relatively thick insulation walls with corresponding low voltage stresses at the outer surface. However, slip-on premolded voltage stress control cones cannot be used with those extruded cables that, for the same voltage rating, have reduced insulation wall thicknesses and, therefore, significantly higher voltage stresses at their outer surfaces, nor can they be used for significantly higher voltage cables.

In Bahder et al. U.S. Pat. No. 4,365,947 issued Dec. 28, 1982, there is described a procedure and apparatus for molding voltage stress control cones in situ on the terminations of insulated high voltage power cables. The object of the invention in said Bahder et al. patent is to assure intimate contact between the cable insulation and the voltage stress control cone. After baring the insulation and insulation shield, the cable is wrapped with an insulating tape to form a preliminary blank roughly conforming to the final geometry desired for the stress control cone. This blank is then surrounded by a mold structure for applying heat and pressure to the blank in order to compress the material to the desired geometry and bind it to the underlying cable structure. A critical part of the process is to assure good contact between the insulation shield and insulation of the cable, on the one hand, and the corresponding element constituting the stress control cone, on the other hand. No separation or voids can be tolerated at the interfaces, for such cavities would give rise to partial discharge of high voltage stresses which discharge would lead eventually to breakdown of the system. The problem becomes severe when the average operating voltage stress of the cable insulation reaches or goes above about 150 volts per mil.

It should be readily apparent that hand wrapping of tapes requires considerable care and is tedious, particularly in cold climates. Attempts have been made to use slip-on premolded voltage stress control cones on high voltage cables, i.e., above 35 kV, but the cone must be installed at a substantial distance from the end, the distance being a function of the voltage rating and environment surrounding the voltage stress control cone. For example, in the case of a 138 kV XLPE (cross-linked polyethylene) cable, where the space between the stress control cone and the termination housing is filled with silicone oil, the stress control cone must be located approximately 50 inches from the end of the cable. To install a premolded cone it is necessary to move it over the cable for this substantial distance. Moving a relatively long element with a very tight fit over this distance and over a comparatively high friction surface becomes very difficult if not impossible. Consequently, the stress control cones have been made of resilient materials having inside diameters slightly larger than the outside diameter over which they have to slide. This then necessitates the use of mechanical compression devices to improve the contact between the adjacent surfaces. Satisfactory contact is not readily obtained. Moreover, in order to obtain the necessary resiliency, the premolded stress control cone has been made of a material having different characteristics than that of the cable insulation about which it is to be installed. This usually results in the specific inductive capacitance being different from the cable insulation and, therefore, gives rise to an electrical field distortion resulting in an irregular voltage stress distribution which may result in concentrating higher voltage stresses on the weakest member.

While the method and apparatus described in said Bahder et al. patent is able to provide a reliable voltage stress control cone, such apparatus is bulky and requires considerable time to prepare the cable termination. A significant disadvantage to such system is that if for any reason something goes wrong in the molding operation, e.g., loss of power or unsatisfactory fusing of the cross-linkable tapes, the entire cable on which the molding has been executed must be scrapped. Since such cable is usually cut to its exact length, it becomes necessary to install a joint and replace a section of the cable in order to apply a new stress control cone. This is time consuming and costly.

It is, therefore, an object of the present invention to provide an improved voltage stress control cone that is convenient to apply to the termination of a high voltage cable near the end thereof and which consistently establishes the required intimate union with the underlying cable insulation.

SUMMARY OF THE INVENTION

In accordance with one aspect of the present invention there is provided a premolded mechanically prestressed voltage stress control cone for high voltage cable termination comprising a body of cross-linked polymeric electrical insulating material having a straight through circular bore concentric with an axis of said body, the outer surface of said body defining a surface of revolution centered about said axis and having a contour in the direction parallel to said axis for controlling the electric field and reducing the maximum electrical voltage gradient to a non-degrading level when assembled with a high voltage cable, a tubular layer of semiconductive cross-linked polymeric material concentric with said axis and extending in one direction up over said body for a predetermined distance and extending in the opposite direction away from said body to define an extension of said bore, said layer being bonded to said body throughout the interface therebetween, and said body and layer having locked-in mechanical stresses that are releasable upon the application of heat to said materials to cause shrinkage in the radial direction of said body and layer for reducing the diameter of said bore.

In accordance with a further aspect of the present invention there is provided the method of fabricating a premolded mechanically prestressed voltage stress control cone of the foregoing construction that comprises the steps of molding the body of cross-linkable polymeric electrical insulating material, bonding to said body a tubular layer of semiconductive cross-linkable polymeric material, forming a straight circular bore of first diameter through said body and said layer concentric with the axis mentioned above, said first diameter being smaller than the outside diameter of the insulation of the predetermined size high voltage cable with which said voltage stress control cone is intended to be assembled, cross-linking said respective materials and thereafter radially expanding said materials under appropriate thermal conditions to mechanically prestress said materials and radially expand said bore to a diameter sufficient to pass with at least a sliding fit over the insulation shield of said predetermined size cable.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PRESENTLY PREFERRED EMBODIMENT

Throughout the specification and claims whenever reference is had to high voltage cables, unless it appears otherwise from the context, it is intended to encompass cables rated at or above 5 kV. That is, the invention can be used advantageously with high voltage cables within that definition. However, depending upon the insulation thickness and other attributes of the cable construction, previously known voltage stress control cone constructions may afford a competitive alternative. But as the cable voltage rating increases above, say, 35 kV, the present invention becomes extremely useful; with cables designed for 138 kV service and higher, the present invention is almost a must.

Figure 1:
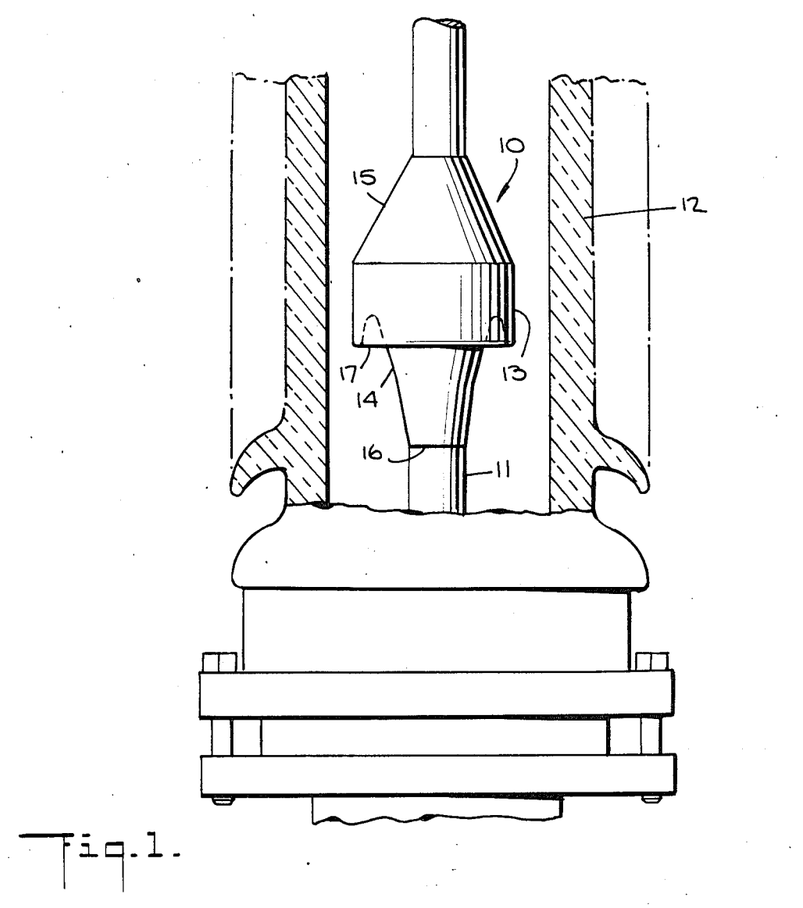
FIG. 1 is a fragmentary elevational view with portions broken away showing the essential elements of a high voltage cable termination including a voltage stress control cone in accordance with the present invention.

Referring to FIG. 1 of the drawings, there is shown a portion of a high voltage termination containing a voltage stress control cone designated generally by the reference numeral 10 secured about a cable 11 within a conventional ceramic insulator 12. The space between the stress control cone 10 and cable 11 on the one hand and the interior of the ceramic insulator 12 on the other hand is filled with a liquid or gaseous dielectric, for example, silicone oil. It will be understood that the cable enters the termination from the bottom as viewed in the drawing and terminates above the stress control cone. The details of construction both above and below the stress control cone form no part of the present invention and are not disclosed herein. The voltage stress control cone 10 has a generally circular cylindrical midsection 13 that merge at one end into a conical end portion 14 and at the other end into a conical portion 15. The outer surface of the conical end portion 14 consists of a tubular layer of semiconductive cross-linked polymeric material concentric with the longitudinal axis of the voltage stress control cone 10, which layer extends from the end 16 to the base of the conical portion where it turns radially outwardly and reentrantly terminating substantially at the edge 17. The semiconductive polymeric layer overlies and is bonded to an underlying body of insulating polymeric material that merges with the cylindrical midsection portion 13. The exposed surfaces of the section 13 as well as the outer surface of portion 15 are electrically insulating in nature.

Figure 2:
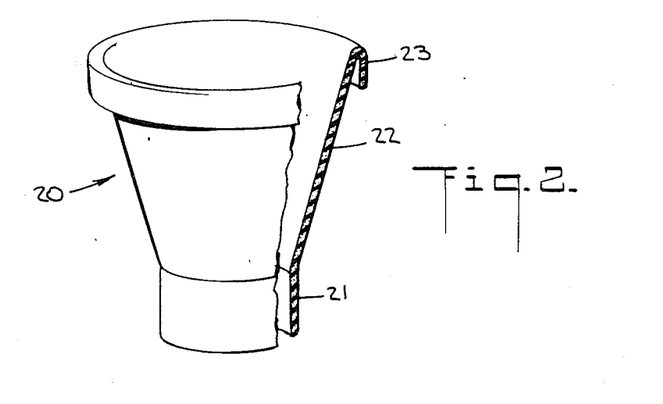
FIG. 2 is a perspective view of a premolded tubular layer of semiconductive plastic material prior to assembly with the insulation material of the voltage stress control cone.

The voltage stress control cone embodying the present invention is constructed by first molding from semiconducting polymeric material the tubular structure shown in FIG. 2, designated generally by the reference numeral 20. For convenience the structure 20 will be referred to hereinafter as the boot.

The boot 20 is shown as having a generally cylindrical tail portion 21 merging with a frusto-conical section 22 that joins the reentrant cuff section 23. It is presently preferred to mold the boot 20 from a cross-linkable ethylene propylene rubber (EPR) semiconducting compound obtainable as product MEP-904-A from Passaic Rubber Company located in Wayne, N.J. The material is supplied as an uncured calendered tape with a polyethylene liner preferably having a width of 1" and thickness of 0.020". It is cured by reacting with dicumyl peroxide under heat and pressure. The uncured tape is wound with a suitable overlap about an aluminum mold core, avoiding use of any mold release agent. After assembling a complemental mold structure, the assembly is heated to a temperature of 160° C. and subjected to 500 p.s.i. pressure for a sufficient period of time to bring the composition to a partial cure ranging somewhere between about 50% and 80% of total cure. Sufficient unreacted peroxide should remain to foster during subsequent processing bonding to the underlying insulating material of the stress control cone.

Figures 3, 4, 5:
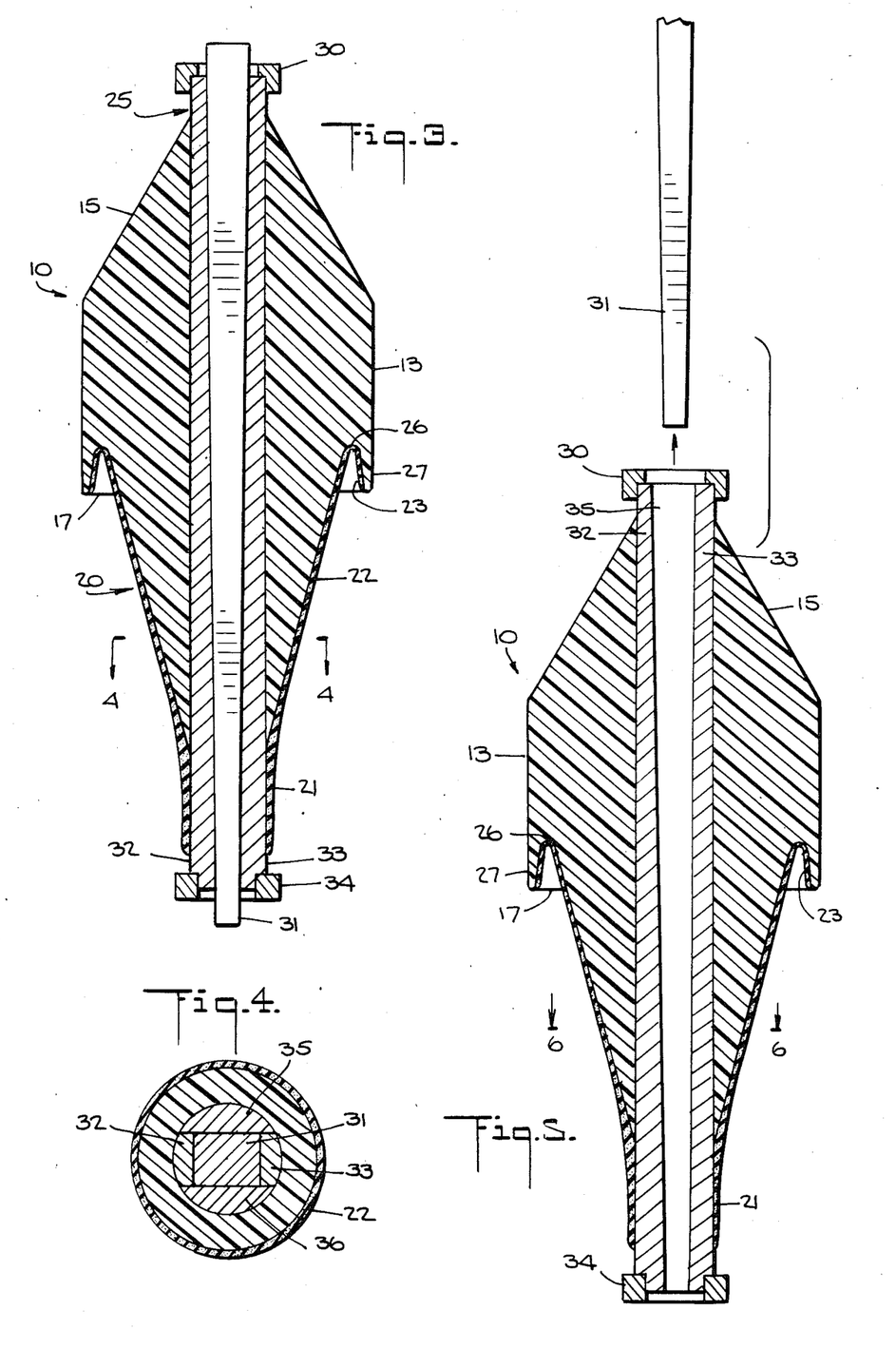
FIG. 3 is a longitudinal sectional view through a collapsing mandrel on which the stress control cone of the presen invention is initially fabricated and showing the assembly at the completion of the preliminary molding operation.
FIG. 4 is a transverse sectional view taken along line 4—4 in FIG. 3.
FIG. 5 is a longitudinal sectional view similar to FIG. 3 showing the first step in dismantling the collapsible mandrel.

The ends of the boot 20 may be trimmed to the precise desired dimensions for the subsequent molding, and the outside edge of the cylindrical portion 21 should be tapered by using a fine sanding drum or the like, the taper being clearly evident in FIG. 3, for example.

Referring now to FIG. 3, the main body portion of the voltage stress control cone 10 is constructed on a special mandrel 25, the details of which will be discussed hereinafter. One method of fabricating the cone structure 10 is to wrap cross-linkable polyethylene tape about the mandrel 25 with the aid of a suitable template. Taping is interrupted when the diameter reaches the point 26 at the bottom of the fin 27. At this time, the semiconducting boot 20 is placed in position, whereupon wrapping of the insulating tape can be continued until the full diameter of the intermediate portion 13 is attained. The end of the tape may be secured in place by any suitable method such as by melt fusing it to an underlying layer of the same material. It should be understood, that as taping progressed the template was used to ensure that the final dimensions approximate that of the mold (not shown) subsequently placed around the body of material built up on the mandrel. The parts of the mold facing the polymeric material should be smooth and provided with a coating of a suitable mold release agent. Thereafter, in known manner heat should be applied to initially bring the mass of the insulation material to a softening temperature of approximately 120° to 130° C. Upon reaching such temperature the system should be pressurized in suitable manner. Next, the temperature is increased to curing level, e.g., 180° C., and this temperature and pressure is maintained for a suitable curing interval. The mold apparatus may be similar to that disclosed in Bahder et al. U.S. Pat. No. 4,365,947 for in situ molding of the voltage stress control cone.

Figures 6, 7, 8:
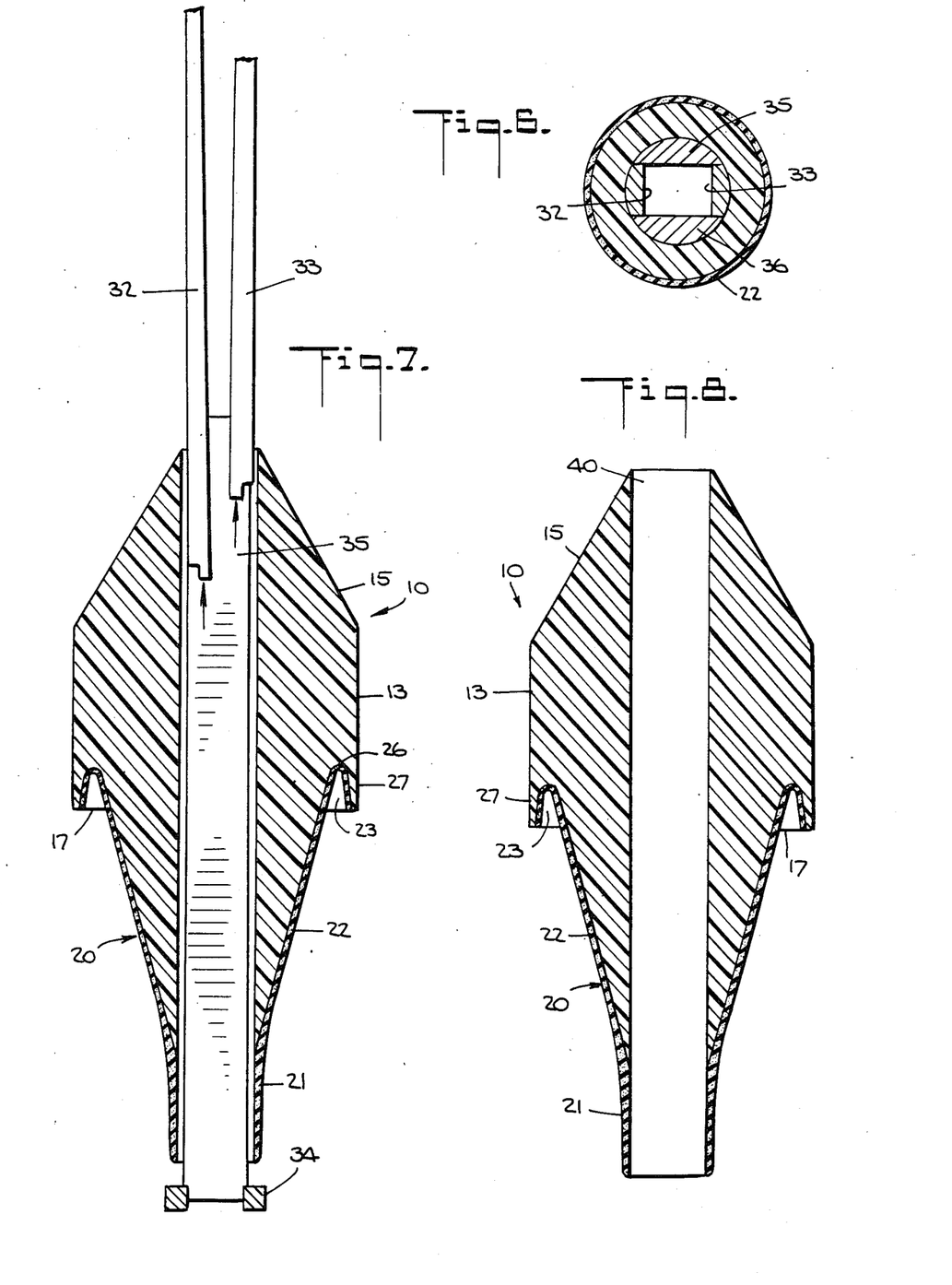
FIG. 6 is a transverse sectional view taken along the line 6—6 in FIG. 5.
FIG. 7 is a view similar to FIG. 3 showing the next step in the disassembly of the collapsible mandrel.
FIG. 8 is a longitudinal sectional view through a stress control cone upon completion of the initial molding procedure.

After the application of heat and pressure for a sufficient time to integrate the wrapped tape into a homogeneous body and bond the same to the boot, the structure is permitted to cool toward ambient temperature. After removal of the surrounding mold it will be found that the stress control cone has shrunk upon the mandrel 25. It is for this reason that the mandrel 25 is constructed to be disassembled as shown by the successive disassembly steps illustrated in FIGS. 5, 6, 7 and 8. Initially, the internal longitudinal wedge 31 is extracted as shown in FIG. 5, and the upper retaining ring 30 is removed. Next, as shown in FIG. 7, the longitudinal opposing side members 32 and 33 are withdrawn from the bottom retaining ring 34. Finally, the remaining members 35 and 36 are brought together and extracted.

The cross-linkable polyethylene used to fabricate the voltage stress control cone is preferably the same or substantially the same material as that in the insulation on the cable over which the stress control cone is to be installed. This ensures that all of the insulating materials have the same electrical characteristics, and avoids the introduction of additional voltage stress problems.

Referring to FIG. 8, it will be appreciated that the voltage stress control cone 10 has a straight through circular bore 40 concentric with the longitudinal axis of the body. The diameter of the bore 40, upon removal of the mandrel 25, should be smaller than the outside diameter of the cable insulation over which the stress control cone is to be applied. For application to a 138 kV cable having insulation with an outside diameter of approximately 2.7", the bore 40, after initial molding as shown in FIG. 8, should have a diameter on the order of 2% less than the cable insulation diameter of 2.7". Satisfactory results have been obtained with voltage stress control cone having an outside diameter at its intermediate section 13 of about 8.5" and an overall length as seen in FIG. 8 of approximately 14".

Instead of the method described above for fabricating the preliminary stage of the voltage stress control cone, the body may be fabricated by injecting heat plasticized material into a mold cavity containing the semiconducting boot as an insert. Any well-known injection molding procedure may be employed for this purpose.

Once the main body of the stress control cone has been produced as described above, it is necessary to radially expand the bore 40 so that the cone will fit easily over the cable on which it is to be applied. Such expansion can be accomplished in the apparatus illustrated in FIGS. 9 and 10 to which attention should now be directed. The apparatus consists of a chamber 50 provided with external heating elements 51, end plates 52 and 53, a specially constructed mandrel 54, a lower conical mold insert or support block 55, and a retractable sleeve member 56. The chamber 50 is furnished with fittings 57 and 58 for permitting pressurizing and cooling fluid to be introduced and circulated through chamber 50. Finally, hydraulic actuators 59 and 60 are provided to advance the mandrel 54 in the downward direction as shown in FIGS. 9 and 10, and actuators 61 and 62 are provided for extracting the sleeve 56.

Figure 9:
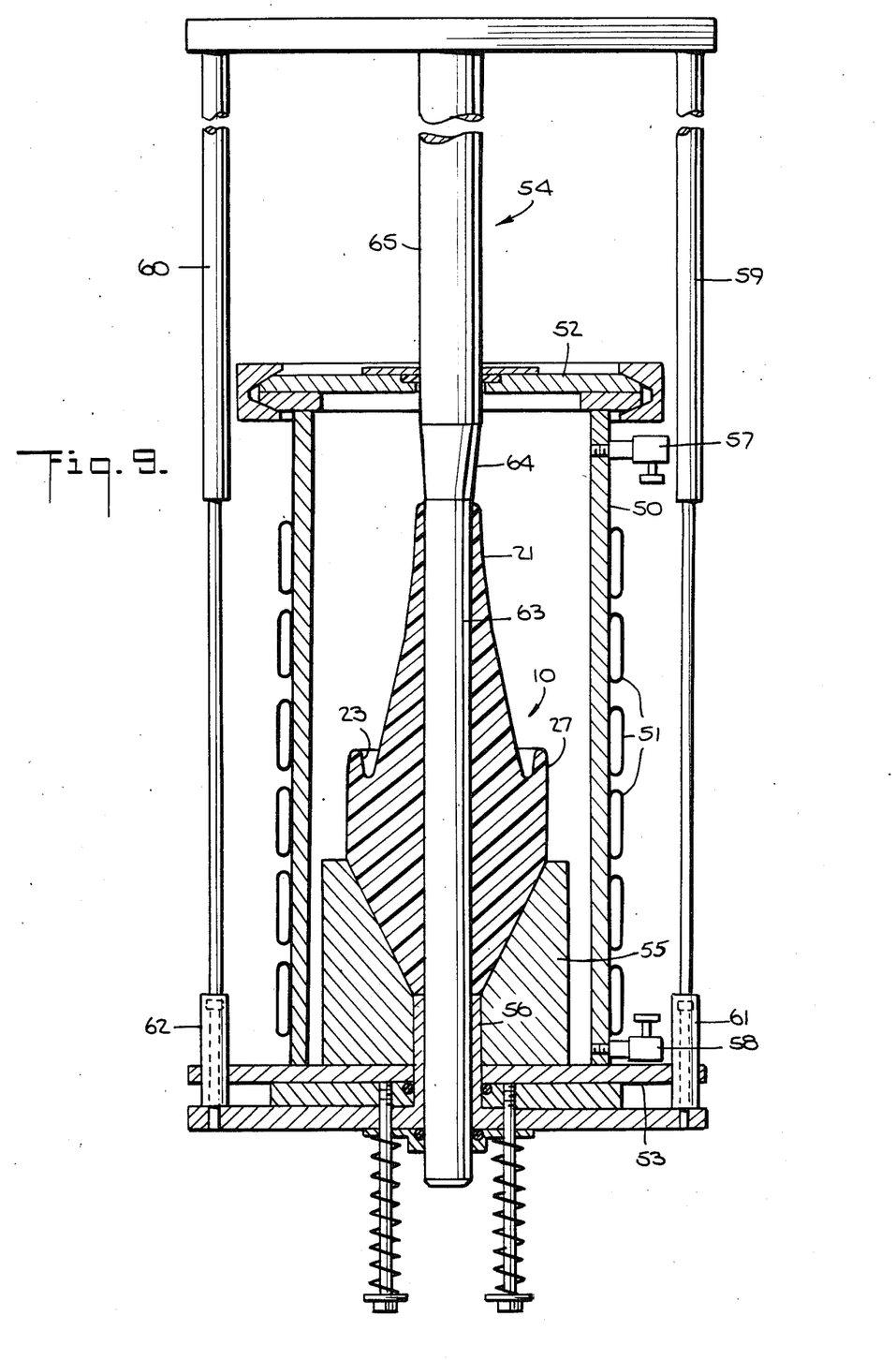
FIG. 9 is a longitudinal sectional view through the molding and expanding apparatus in which the stress control cone in FIG. 8 has been installed in preparation for radial expansion of the bore therethrough.
Figure 10:
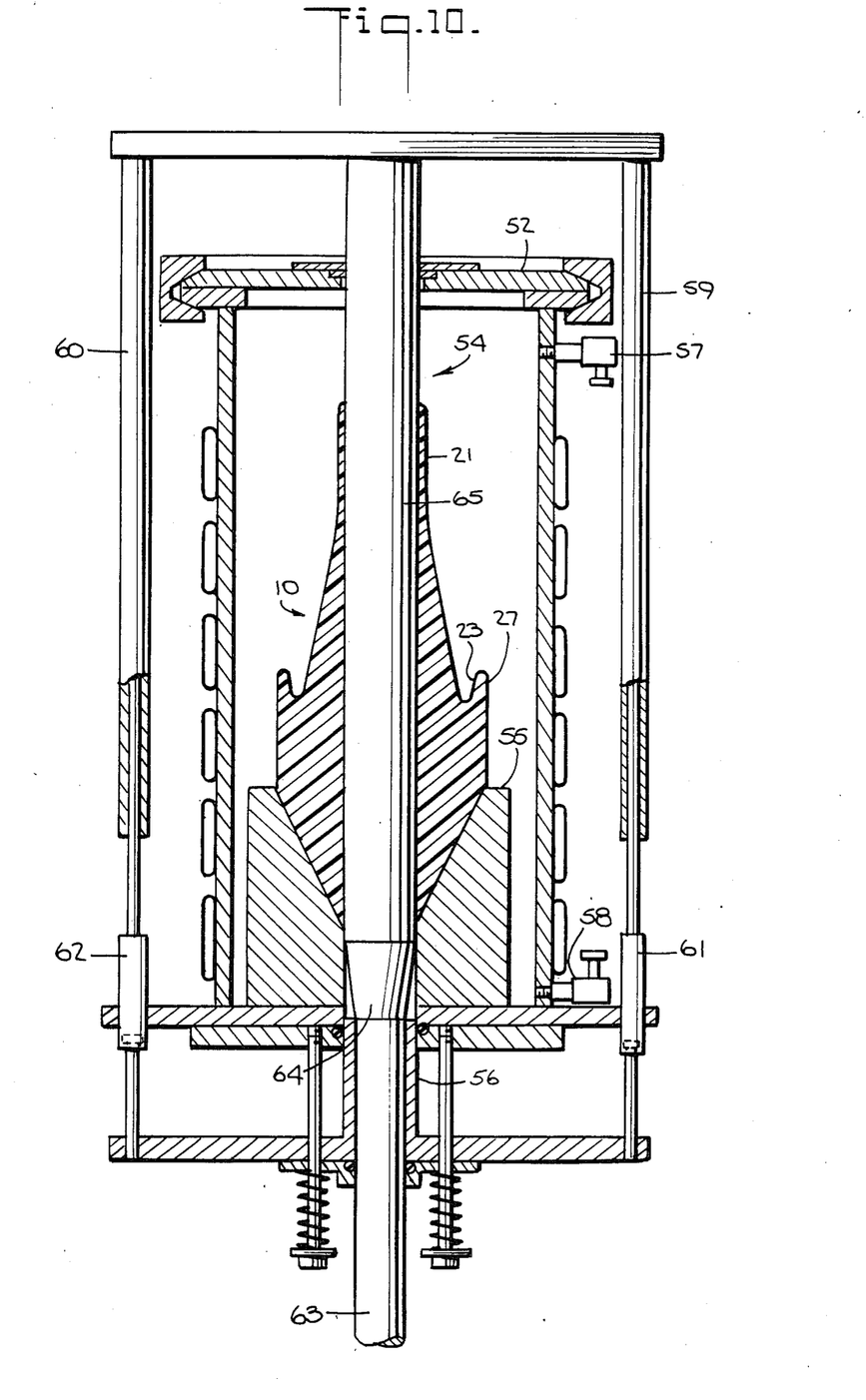
FIG. 10 is a view similar to FIG. 9 showing the expanding mandrel at the end of its vertical travel (as viewed in the drawing) through the stress control cone to radially expand the latter.

Referring to FIG. 9, it will be seen that the mandrel 54 has a first section 63 with an outside diameter approximating the diameter of bore 40 after the initial forming operation. The section 63 of the mandrel connects via a tapered transition zone 64 with a section 65 of enlarged diameter slightly larger than the outside diameter of the insulation on the cable to which the stress control cone is to be applied. In addition, although not shown in the drawings, the mandrel 54 should be collapsible somewhat in the same manner as the mandrel 25 described with reference to FIGS. 1 to 8.

With the mandrel 54 removed along with cover plate 52, the pre-molded voltage stress control cone member 10 is installed resting on the insert 55 with the sleeve 56 in its upper position as shown in FIG. 9. Then, the cover 52 is installed along with the mandrel 54. After hermetically sealing the chamber 50, heat is applied until the temperature inside the chamber reaches a uniform level of about 120° to 130° C. A suitable fluid, preferably an inert gas such as nitrogen, is now introduced via fittings 57 and 58 to slightly pressurize the interior of chamber 50. Next, the temperature is increased to about 170° C. and the mandrel 54 is slowly urged through the bore of the element 10 until the tapered section 64 reaches the lower edge of the voltage stress control cone material and the upper edge of the sleeve 56. Now actuators 61 and 62 lower the sleeve 56 to the position shown in FIG. 10, whereupon the mandrel 54 can continue its downward travel to the position shown in FIG. 10. Once the full downward travel of the mandrel is attained as shown in FIG. 10, the pressure inside the chamber 50 may be increased to minimize the likelihood of void formation. Now the chamber 50 can be cooled to room temperature. If necessary, cooling can be accelerated by chilling the pressurizing fluid circulating through the chamber 50 by means of fittings 57 and 58.

When the mechanically expanded voltage stress control cone has cooled to 40° C. or below, the pressure in the chamber 50 is released, the cover 52 is removed, and the mandrel 54 is disassembled and extracted.

Figure 11:
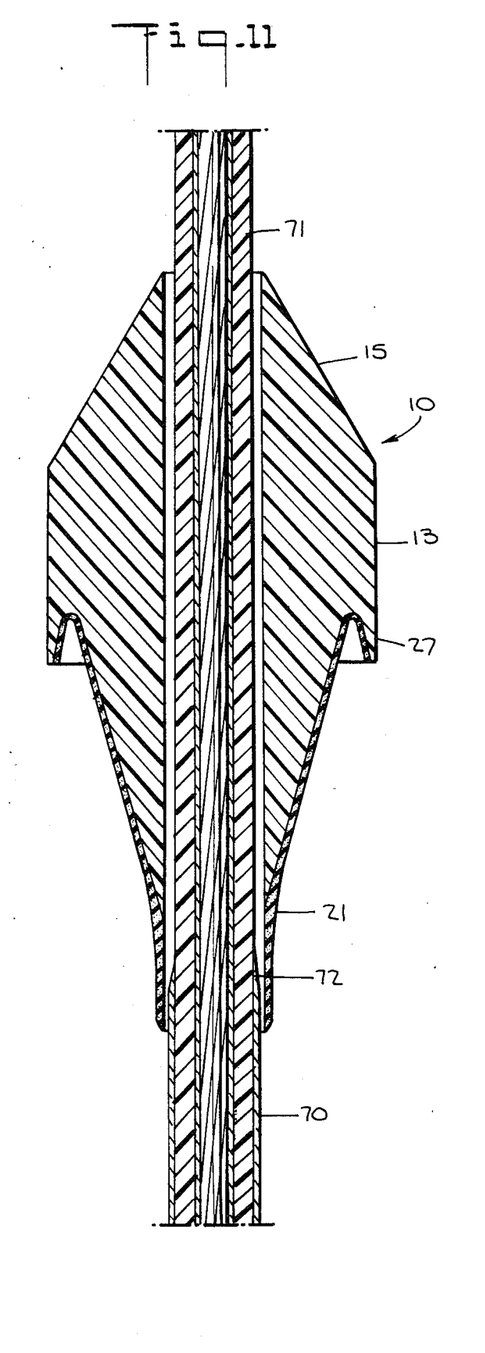
FIG. 11 is a longitudinal sectional view through a stress control cone embodying the present invention after fabrication thereof and upon installation over a cable end in preparation for final installation thereon.
Figure 12:
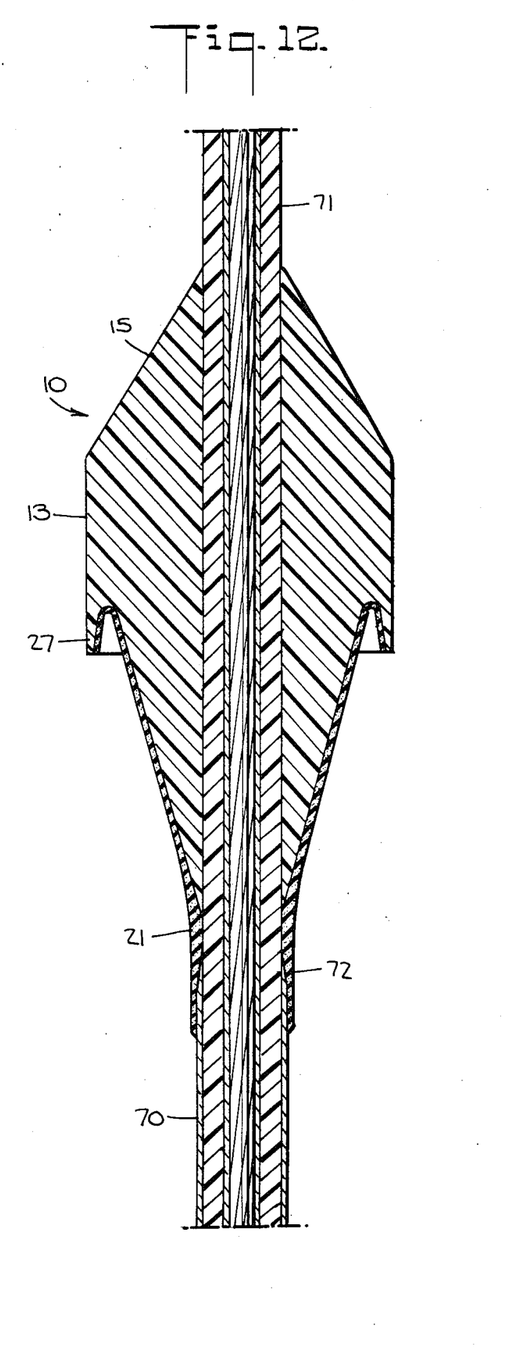
FIG. 12 is a view similar to FIG. 11 showing the completed assembly after the application of heat to radially shrink the stress control cone upon the cable.

It has been found that cross-linkable polyethylene similar to that used for cable insulation has the characteristic of plastic memory wherein mechanical stresses can be locked into the part which mechanical stresses can be released upon subsequent application of heat. Consequently, the mechanically prestressed expanded voltage stress control cone will slip readily onto the end of a cable as shown in FIG. 11 where the insulation shield 70 has been removed over the area 71 and suitably tapered in the region 72. Upon the application of suitable heat to the voltage stress control cone, it will shrink in diameter producing a snug, tight fitting assembly as shown in FIG. 12.

Heat for shrinking the mechanically prestressed voltage stress control cone onto the cable can be applied in any convenient manner such as by the use of heating tapes or a heating blanket or the like. If desired, the exposed surface of the cable over which the mechanically prestressed voltage stress control cone is applied may first be coated with a thermal active cement, for example, a paint made with dicumyl peroxide. Alternatively, an intermediate layer may be provided of cross-linkable material capable of binding to both the cable and the stress control cone during the heat shrinking process.

Although the production of the stress control cone has been shown as involving a two-step process, it can be produced in a single operation if the collapsible mandrel and molds are suitably designed to allow for the radial expansion of the molded body after its initial formation and after cross-linking.

When applying the stress control cone to the end of a cable, it may be desirable to partially pre-shrink the stress control cone by the application of heat to a size close to the diameter of the cable. This will faciliate proper positioning of the stress control cone on the cable and make it easier to maintain such position during the final shrinkage phase.

Due to the shrinkage of the stress control cone down over the cable, any irregularities in the inside diameter of the bore of the stress control cone or the outside diameter of the cable will be accommodated so as to ensure good and intimate contact therebetween. The cable does not have to be perfectly round in order to accept the stress control cone.

A particular advantage arising from the present invention is that the insulation of both the cable and the voltage stress control cone can be of the same material. This provides for an improved distribution of voltage stresses and, more importantly, ensures that the materials have similar thermal expansion properties such that separation does not occur during thermal cycling in use.

The foregoing description describes one method of fabricating the voltage stress control cone. However, those skilled in the subject art will appreciate that various alternative methods can be used to produce the finished product. For example, instead of molding the semiconducting boot in a preliminary operation, suitable semiconducting tape can be applied to the insulating sub-structure of the cone for simultaneous molding. Another method is to form the insulating body first. Then wrap the semiconducting tape thereon and mold it in place.

While the fin 27 is extremely important for very high voltage installations, it becomes less important at lower operating voltages. Therefore, where voltage use considerations permit, the fin can be omitted.

The construction of the expanding mandrels can take any form known to the art, the particular mandrel shown in the drawings only being presented by way of illustration.

Satisfactory results have been obtained by constructing the stress control cone with cross-linkable polyethylene. However, other materials are well known to the art as useful for producing cable insulation. Any of such cable insulating materials that fall within the category of cross-linkable thermosetting polymer can be employed in practicing the present invention. Examples are cross-linkable ethylene propylene rubber and cross-linkable silicone rubber.

Another variation that may be useful is to employ a non-uniform expanding mandrel so that the stress control cone will have one diameter in a region to surround the insulation shield and another diameter in the region to surround the cable insulation.

Having described the invention with reference to the presently preferred embodiment thereof, it will be understood by those skilled in the art that various changes may be introduced without departing from the true spirit of the invention as defined in the appended claims.

What is claimed is:

1. A premolded mechanically prestressed voltage stress control cone for high voltage cable termination comprising a body of cross-linked polymeric electrical insulating material having a straight through circular bore concentric with an axis of said body, the outer surface of said body defining a surface of revolution centered about said axis and having a contour in the direction parallel to said axis for controlling the electric field and reducing the maximum electrical voltage gradient to a non-degrading level when assembled with a high voltage cable, a tubular layer of semiconductive cross-linked polymeric material concentric with said axis and extending in one direction up over said body for a predetermined distance and extending in the opposite direction away from said body to define an extension of said bore, said layer being bonded to said body throughout the interface therebetween, and said body and layer having locked-in mechanical stresses that are releasable upon the application of heat to said materials to cause shrinkage in the radial direction of said body and layer for reducing the diameter of said bore.

2. A premolded mechanically prestressed voltage stress control cone according to claim 1, characterized in that said body consists essentially of a cross-linked polyethylene composition.

3. A premolded mechanically prestressed voltage stress control cone according to claim 2, characterized in that said layer comprises an ethylene propylene rubber composition.

4. A premolded mechanically prestressed voltage stress control cone according to claim 1, characterized in that said layer comprises an ethylene propylene rubber composition.

5. A premolded mechanically prestressed voltage stress control cone according to claim 1, characterized in that said body has a generally circular cylindrical midsection merging at least at one of its ends into a conical end portion, said conical end portion being within said tubular layer and bonded thereto, said midsection and said end portion surrounding and defining at least part of said bore.

6. A premolded mechanically prestressed voltage stress control cone according to claim 5, characterized in that said stress control cone is constructed for assembly to a high voltage cable having insulation with a given outside diameter, and said stress control cone has the ability, upon the application of heat, of shrinking to reduce the diameter of said bore, if unrestrained, to a diameter that is smaller than said given diameter of said insulation.

7. A premolded mechanically prestressed voltage stress control cone according to claim 6, characterized in that said body consists essentially of a cross-linked polyethylene composition.

8. A premolded mechanically prestressed voltage stress control cone according to claim 7, characterized in that said layer comprises an ethylene propylene rubber composition.

9. A premolded mechanically prestressed voltage stress control cone according to claim 5, characterized in that said body consists essentially of a cross-linked polyethylene composition.

10. A premolded mechanically prestressed voltage stress control cone according to claim 9, characterized in that said layer comprises an ethylene propylene rubber composition.

11. A premolded mechanically prestressed voltage stress control cone according to claim 1, characterized in that said stress control cone is constructed for assembly to a high voltage cable having insulation with a given outside diameter, and said stress control cone has the ability, upon the application of heat, of shrinking to reduce the diameter of said bore, if unrestrained, to a diameter that is smaller than said given diameter of said insulation.

12. A premolded mechanically prestressed voltage stress control cone according to claim 11, characterized in that said body consists essentially of a cross-linked polyethylene composition.

13. A premolded mechanically prestressed voltage stress control cone for high voltage cable termination comprising a body of cross-linked polymeric electrical insulating material having a generally circular cylindrical midsection merging at opposite ends into conical end portions, one of said end portions being surrounded by a layer of semiconductive cross-linked polymeric material that extends beyond the outer end of said one end portion, a through bore concentric with the longitudinal axis of said body and layer, said longitudinal axis being coincident with the axis of the radially outer surface of said midsection, and said body and layer having locked-in mechanical stresses that are releasable upon the application of heat to said materials to cause shrinkage in the radial direction of said body and layer for reducing the diameter of said bore.

14. The method of fabricating a premolded mechanically prestressed voltage stress control cone for high voltage cable termination that comprises the steps of molding a body of cross-linkable polymeric electrical insulating material to have an outer surface configured to define a surface of revolution centered about an axis and having a contour in the direction parallel to said axis for controlling the electric field and reducing the maximum electrical voltage gradient to a non-degrading level when assembled with a given high voltage cable, bonding to said body a tubular layer of semiconductive cross-linkable polymeric material concentric with said axis and extending in one direction up over said body for a predetermined distance and extending in the opposite direction away from said body, forming a straight circular bore of first diameter through said body and said layer concentric with said axis said first diameter being smaller than the outside diameter of the insulation of the predetermined size high voltage cable with which said voltage control cone is intended to be assembled, cross-linking said respective materials and thereafter radially expanding said materials under appropriate thermal conditions to mechanically prestress said materials and radially expand said bore to a diameter sufficient to pass with at least a sliding fit over the insulation shield of said predetermined size cable.

* * * * *